US008271149B2

(12) United States Patent
Builta

(10) Patent No.: US 8,271,149 B2
(45) Date of Patent: Sep. 18, 2012

(54) CONVERSION SYSTEM FAULT MANAGEMENT SYSTEM FOR TILTROTOR AIRCRAFT

(75) Inventor: Kenneth E. Builta, Euless, TX (US)

(73) Assignee: Bell Helicopter Textron Inc., Hurst, TX (US)

( * ) Notice: Subject to any disclaimer, the term of this patent is extended or adjusted under 35 U.S.C. 154(b) by 1674 days.

(21) Appl. No.: 11/507,035

(22) Filed: Aug. 21, 2006

(65) Prior Publication Data

US 2009/0312891 A1    Dec. 17, 2009

(51) Int. Cl.
    *G01C 23/00* (2006.01)
(52) U.S. Cl. .............. 701/3; 244/56; 244/12.4; 244/194; 244/66
(58) Field of Classification Search .............. 701/3, 207; 244/194, 66, 56, 17.27, 7 A, 7 C, 7 R, 17.11, 244/221, 55, 76, 75.1, 12.4, 76 R
    See application file for complete search history.

(56) References Cited

U.S. PATENT DOCUMENTS

| 5,054,776 | A  | * | 10/1991 | Wyman ........................... 473/34 |
| 5,839,691 | A  | * | 11/1998 | Lariviere ....................... 244/7 R |
| 6,247,667 | B1 | * | 6/2001  | Fenny et al. ................... 244/7 R |
| 6,457,672 | B1 |   | 10/2002 | Tai |
| 7,059,562 | B2 | * | 6/2006  | Baldwin ........................ 244/12.4 |
| 7,249,732 | B2 | * | 7/2007  | Sanders et al. ............... 244/23 A |
| 7,267,300 | B2 | * | 9/2007  | Heath et al. ................... 244/12.3 |
| 7,481,396 | B2 | * | 1/2009  | Kish ................................ 244/60 |
| 7,571,879 | B2 | * | 8/2009  | Builta et al. .................. 244/194 |
| 7,584,923 | B2 | * | 9/2009  | Burrage ........................ 244/7 R |
| 7,584,932 | B2 | * | 9/2009  | Shih ............................. 248/354.3 |
| 7,617,024 | B2 | * | 11/2009 | Builta ............................. 701/10 |
| 7,913,947 | B2 | * | 3/2011  | Haynes et al. .................. 244/56 |
| 2007/0158494 | A1 | * | 7/2007  | Burrage ........................ 244/7 R |
| 2007/0241228 | A1 | * | 10/2007 | Haynes et al. ................ 244/7 A |
| 2009/0114764 | A1 | * | 5/2009  | Builta et al. ............... 244/17.13 |
| 2009/0159741 | A1 | * | 6/2009  | Verde Preckler et al. ....... 244/56 |

(Continued)

FOREIGN PATENT DOCUMENTS

WO    WO 01/10712    2/2001

OTHER PUBLICATIONS

"V-22 Nacelle Conversion Actuator," G. White, Lucal Western Inc., California, USA—Proc Instn Mech Engrs. vol. 207—ImechE 1993, cited by other.*

(Continued)

*Primary Examiner* — Cuong H Nguyen
(74) *Attorney, Agent, or Firm* — Pillsbury Winthrop Shaw Pittman LLP

(57) ABSTRACT

The difference between a first position of a first pylon of a tiltrotor aircraft and a second position of a second pylon of the aircraft is prevented from becoming too large. An actuator position error for the first pylon is calculated from a difference between the first position and a commanded first position of the first pylon. An actuator position error for the second pylon is calculated from a difference between the second position and a commanded second position of the second pylon. An absolute value of the actuator position error for the first pylon is compared to the preset limit. If the absolute value of the actuator position error for the first pylon is greater than or equal to a preset limit, the actuator position error for the second pylon is calculated from the difference between the first position and the second position.

29 Claims, 4 Drawing Sheets

U.S. PATENT DOCUMENTS

2009/0312891 A1* 12/2009 Builta ............................ 701/3

OTHER PUBLICATIONS

"Design of Tiltrotor Flight Control System Using Optical Control." Fan Yonghua and Yang Jun. Proceedings of the 26th Chinese Control Conference, Jul. 26-31, 2007, cited by other.*
"Active Control of Flight Path and Critical Loads in Tilt-Rotor Aircraft." Daniel J Walker and Mark Kairaj Voskuijl. American Helicopter Society 63rd Annual Forum. May 1-3, 2007. cited by other.*
"Adaptive Model Inversion Flight Control for Tiltrotor Aircraft." Anthony J Calise and Rolf T Rysdyk. AIAA Guidance, Navigation and Control Conference, Aug. 1997. cited by other.*
"V-22 Nacelle Conversion Actuator," G. White, Lucal Western Inc., California, USA—Proc Instn Mech Engrs. vol. 207—ImechE 1993, cited by others.*
Robust nonlinear adaptive flight control for consistent handling qualities; Rysdyk, R.; Calise, A.J.; Control Systems Technology, IEEE Transactions on; vol. 13 , Issue: 6; Digital Object Identifier: 10.1109/TCST.2005.854345 Publication Year: 2005 , pp. 896-910.*
A Modified Simplex Method Based on Homotopy Continuation Principle and Application to Tiltrotor Airplane; Xili Yang; Jihong Zhu; Yuhui Tao; Zengqi Sun; Intelligent Control and Automation, 2006. WCICA 2006. The Sixth World Congress on vol. 1; Digital Object Identifier: 10.1109/WCICA.2006.1712651; Publication Year: 2006 , pp. 1740-1744.*
XV-15 tiltrotor flight control system design using model predictive control; Mehra, R.K.; Prasanth, R.K.; Gopalaswamy, S.; Aerospace Conference, 1998. Proceedings., IEEE; vol. 2 ; Digital Object Identifier: 10.1109/AERO.1998.687905 Publication Year: 1998 , pp. 139-148 vol. 2.*
Modeling and control of a small autonomous aircraft having two tilting rotors; Kendoul, F.; Fantoni, I.; Lozano, R.; Decision and Control, 2005 and 2005 European Control Conference. CDC-ECC '05. 44th IEEE Conference on; Digital Object Identifier: 10.1109/CDC.2005.1583480; Publication Year: 2005 , pp. 8144-8149.*
Tiltrotor analytic flight test and training support; Carico, D.; Aerospace Conference Proceedings, 2002. IEEE; vol. 5; Digital Object Identifier: 10.1109/AERO.2002.1035428; Publication Year: 2002 , pp. 5-2501-5-2510 vol. 5.*
Proactive open system architecture design concepts for the V-22 Osprey tiltrotor ; Bayruns, T.; Koenig, J.R.; Digital Avionics Systems Conference, 2002. Proceedings. The 21$^{st}$; vol. 1; Digital Object Identifier: 10.1109/DASC.2002.1067970 Publication Year: 2002 , pp. 5C1-1-5C1-10 vol. 1.*
Adaptive nonlinear control for tiltrotor aircraft; Rysdyk, R.T.; Calise, A.J.; Control Applications, 1998. Proceedings of the 1998 IEEE International Conference on; vol. 2; Digital Object Identifier: 10.1109/CCA.1998.721604 Publication Year: 1998 , pp. 980-984 vol. 2.*
Design and implementation of the V-22 tiltrotor aircuaft vibration monitoring and diagnostic system; Dousis, D.A.; Aerospace Conference Proceedings, 2000 IEEE; vol. 6; Digital Object Identifier: 10.1109/AERO.2000.877901; Publication Year: 2000 , pp. 245-261 vol. 6.*
V-22 tiltrotor aircraft vibration monitoring from design to field operations; Dousis, D.A.; Aerospace Conference Proceedings, 2002. IEEE; vol. 6; Digital Object Identifier: 10.1109/AERO.2002.1036147; Publication Year: 2002 , pp. 6-3051-6-3064 vol. 6.*
ZPETC Path-Tracking gain-scheduling design and real-time multi-task flight simulation for the automatic transition of tilt-rotor aircraft Chih-Cheng Peng et al.; Robotics Automation and Mechatronics (RAM), 2010 IEEE Conference on; Digital Object Identifier: 10.1109/RAMECH.2010.5513203;Pub Year: 2010 , pp. 118-123.*
Neural network path-tracking and real-time multi-task flight simulation for the automatic transition of tilt-rotor aircraft; Yi-Jing Lin; Thong-Shing Hwang; Chih-Cheng Peng; Ching-Yi Chang; Wei-Ren Lai; Control Conference (ASCC), 2011 8th Asian Publication Year: 2011 , pp. 459-464.*
White, G., "V-22 nacelle conversion actuator", Proceedings of the Institution of Mechanical Engineering, Part E. Journal of Process Mechanical Engineering, Mechanical Engineering Publications, London, GB, vol. 207, No. G01, Jan. 1, 1993, pp. 61-72, XP000964772, ISSN: 0954-4089.
International Search Report and Written Opinion of the International Searching Authority, PCT/US2007/017702, Mail Date: Nov. 11, 2008.

* cited by examiner

CONVERSION SYSTEM FAULT MANAGEMENT SYSTEM FOR TILTROTOR AIRCRAFT

BACKGROUND OF THE INVENTION

1. Field of the Invention

Embodiments of the present invention relate to nacelle or pylon control for tiltrotor aircraft. More particularly, embodiments of the present invention relate to systems and methods for monitoring the positions of two nacelles or pylons on either side of a wing of a tiltrotor aircraft and preventing the two nacelles or pylons from going to significantly different positions than their commanded positions in the event that either one cannot be moved, or cannot be moved fast enough.

2. Background Information

A tiltrotor aircraft is generally an aircraft that can fly like a helicopter or like a propellered airplane, depending on the position of its rotors. A tiltrotor aircraft typically has at least one wing and at least two rotors located at either end of the wing. Each rotor is connected to a pod and each pod is, in turn, connected to the wing.

The pods are used to position each rotor relative to the wing. A pod that encloses one or more engines powering the rotor connected to the pod and positions the engine in addition to the rotor is called a nacelle. A pod that does not contain an engine powering the rotor connected to the pod is called a pylon. The term "pylon" is hereinafter used to refer to a pod, a nacelle, or a pylon.

A tiltrotor aircraft can be flown like a helicopter by generally positioning the pylons of the aircraft relative to the wing so that the rotors rotate about a generally vertical axis and in a horizontal plane. A tiltrotor can be flown like a propellered airplane by generally positioning the pylons of the aircraft so that the rotors rotate about a horizontal axis and in a vertical plane. The process of changing the position of the pylons of a tiltrotor aircraft between the vertical position (helicopter mode) and the horizontal position (airplane mode) during flight is called conversion. During conversion the two pylons on either side of a wing of a tiltrotor aircraft should not have significantly different positions than the commanded positions or move at significantly different rates than the commanded rates.

In view of the foregoing, it can be appreciated that a need exists for systems and methods that monitor the positions of two pylons on either side of a wing of a tiltrotor aircraft and the commanded positions of two pylons on either side of a wing of a tiltrotor aircraft and prevent the two pylons from going to significantly different positions than the commanded positions.

BRIEF SUMMARY OF THE INVENTION

One embodiment of the present invention is a method for preventing a difference in the positions of a first pylon and a second pylon of a tiltrotor aircraft by monitoring a difference between a first position of the first pylon and a first commanded position of the first pylon and a difference between a second position of the second pylon and a second commanded position of the first pylon, where the first pylon and the second pylon are located at either end of a wing of the tiltrotor aircraft. An actuator position error for the first pylon is calculated from the difference between the first position and a commanded first position of the first pylon. An actuator position error for the second pylon is calculated from the difference between the second position and a commanded second position of the second pylon. An absolute value of the actuator position error for the first pylon is compared to a preset limit. If the absolute value of the actuator position error for the first pylon is greater than or equal to the preset limit, the actuator position error for the second pylon is calculated from the difference in the positions of the first pylon and the second pylon.

Another embodiment of the present invention is a system for preventing a difference in the positions of a first pylon and a second pylon of a tiltrotor aircraft by monitoring a difference between a first position of the first pylon and a first commanded position of the first pylon and a difference between a second position of the second pylon and a second commanded position of the first pylon, where the first pylon and the second pylon are located at either end of a wing of the tiltrotor aircraft. The system includes a first calculating unit, a second calculating unit, a first comparator, a second comparator, and a switching unit. The first calculating unit calculates an actuator position error for the first pylon from the difference between the first position and a commanded first position of the first pylon. The second calculating unit calculates an actuator position error for the second pylon from the difference between the second position and a commanded second position of the second pylon. The first comparator compares an absolute value of the first actuator position error to the preset limit. The second comparator compares an absolute value of the second actuator position error to the preset limit.

The first calculating unit is connected to the switching unit through the first comparator. The second calculating unit is connected to the switching unit through the second comparator. If the absolute value of the actuator position error for the first pylon is greater than or equal to the preset limit, the switching unit switches an input of the second calculating unit so that the actuator position error for the second pylon is calculated from the difference in the positions of a first pylon and a second pylon.

Another embodiment of the present invention is a method for controlling first and second pylons for a tiltrotor aircraft. A first pylon of the tiltrotor aircraft is moved. A second pylon of the tiltrotor aircraft is moved. In the event of determining that one of the first pylon or the second pylon is not moved sufficiently in accordance with its associated command, then both the first and the second pylon are moved based, at least in part, on movement of the one pylon that is not moving sufficiently.

Another embodiment of the present invention is a method for controlling first and second pylons for a tiltrotor aircraft. A first pylon of the tiltrotor aircraft is positioned to a first commanded position. A second pylon of the tiltrotor aircraft is positioned to a second commanded position. The positions of the first pylon and the second pylon are determined. In the event that the positioning of one of the first pylon or the second pylon does not correspond to its associated commanded position, then both the first pylon and the second pylon are positioned, at least in part, on the positioning of the one pylon.

Figure 1:
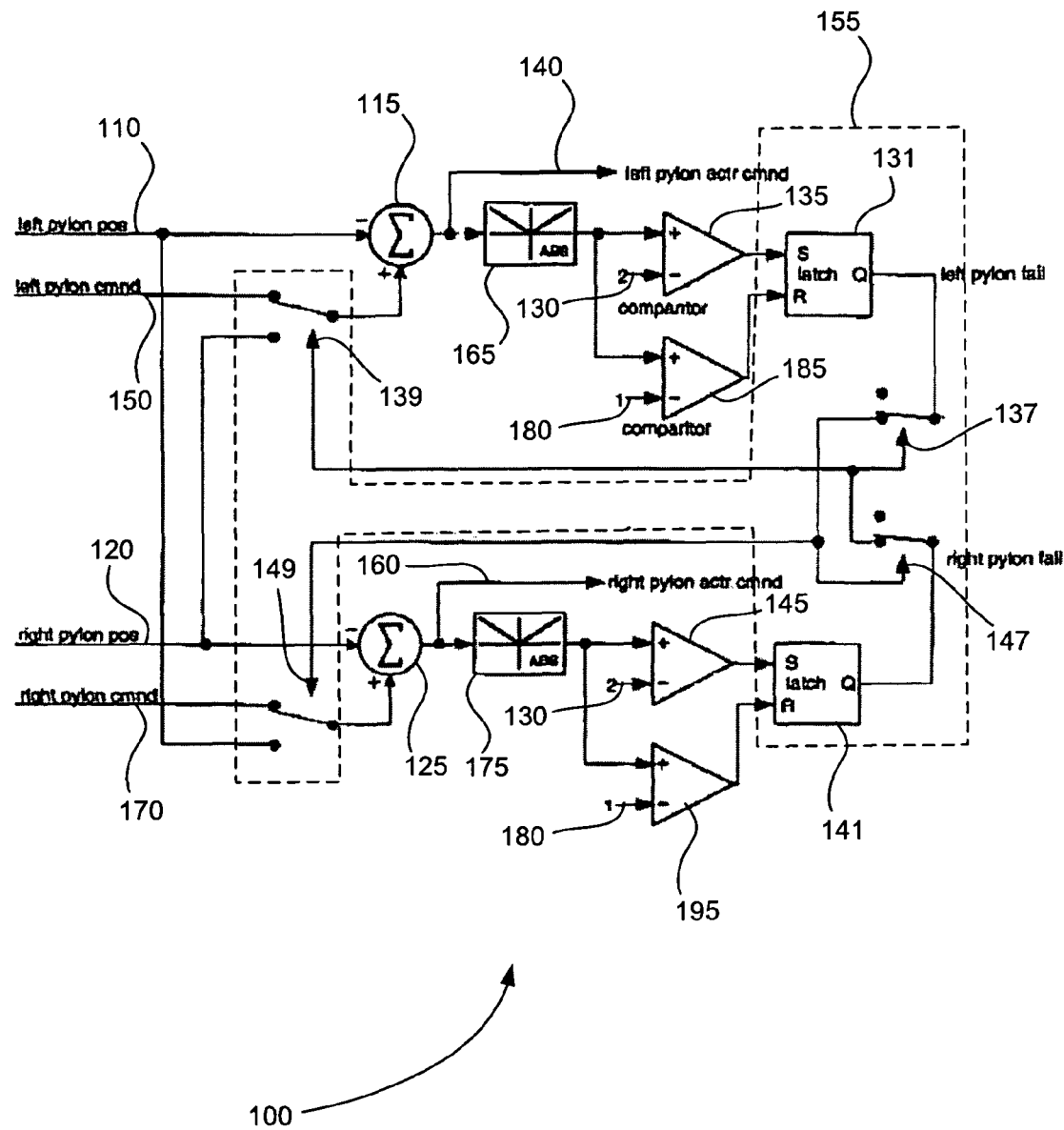
FIG. 1 is a schematic diagram of a system for preventing a difference in the positions of a first pylon and a second pylon of a tiltrotor aircraft by monitoring a difference between a first position of the first pylon and a first commanded position of the first pylon and a difference between a second position of the second pylon and a second commanded position of the first pylon, where the first pylon and the second pylon are located at either end of a wing of the tiltrotor aircraft, in accordance with an embodiment of the present invention.

Before one or more embodiments of the invention are described in detail, one skilled in the art will appreciate that the invention is not limited in its application to the details of construction, the arrangements of components, and the arrangement of steps set forth in the following detailed description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE INVENTION

According to an embodiment of the present invention, the difference between the commanded pylon position and the actual pylon position is monitored for each of the left and right pylons of a wing of a tiltrotor aircraft. A pylon position is a pylon angle relative to the wing, for example. If the difference exceeds a preset limit, then a fault is declared for that pylon. The preset limit is two degrees, for example.

There are several types of faults that can cause the difference to exceed the preset limit. These faults include, but are not limited to, a pylon being jammed and not being able to move, a pylon that can only move at a reduced velocity, and a pylon that is moved to an un-commanded position. Each of these faults, if not detected and corrected, can cause the loss of an aircraft.

When a fault is detected for a pylon, referred to as the "bad pylon," the other pylon, referred to as the "good pylon," has its normal position command switched off, and the position of the bad pylon becomes the position command for the good pylon. Also, after a fault is declared for the bad pylon, the control logic will not allow a fault to be declared for the good pylon, until the fault at the bad pylon is resolved. Therefore, the good pylon is forced to the position of the bad pylon to resolve the fault. If the fault occurs because a bad pylon is moving at a slower than normal rate, the bad pylon eventually gets to the commanded position, the fault indication goes away, and each pylon once again is driven by its own command.

When a good pylon is commanded to move to the position of a bad pylon, the tiltrotor aircraft can continue to fly at that particular pylon angle. If the aircraft is in the helicopter configuration, the aircraft can continue flying and can be landed at a desired location. If the aircraft is in the conversion or airplane configuration, then it can continue to be flown in that configuration and an emergency landing can be performed at a designated location. Thus, commanding the good pylon to move to the position of the bad pylon when a fault is detected can prevent an immediate crash and provide the opportunity to select a proper location for an emergency landing.

Commanding the good pylon to move to the position of the bad pylon also mitigates the fault that occurs when the bad pylon can only be moved at a reduced rate or velocity. Each time the bad pylon is commanded to move faster than the reduced velocity, the good or faster pylon is commanded to move to the position of the bad or slower pylon. When the good pylon reaches the desired position, the fault indication is removed and each pylon is moved by its own command until another command exceeds the reduced velocity of the bad pylon.

Faults resulting from a pylon moving at a reduced velocity, if not detected and corrected, can also cause the loss of the aircraft. Commanding the good pylon to move to the position of the bad pylon can prevent the loss of or damage to the aircraft and only results in a slower rate of conversion. The aircraft can continue to convert from an airplane to a helicopter configuration and land normally.

FIG. 1 is a schematic diagram of a system 100 for preventing a difference in the positions of a first pylon and a second pylon of a tiltrotor aircraft by monitoring a difference between a first position 110 of the first pylon and a first commanded position of the first pylon and a difference between a second position 120 of the second pylon and a second commanded position of the first pylon, where the first pylon and the second pylon are located at either end of a wing of the tiltrotor aircraft, in accordance with an embodiment of the present invention. The first pylon is the left pylon and the second pylon is the right pylon of the tiltrotor aircraft, for example. System 100 includes first calculating unit 115, second calculating unit 125, first comparator 135, second comparator 145, and switching unit 155. Although system 100 includes elements depicting hardware components, such as comparators, latches, and switches, system 100 is not limited to a hardware implementation and can be implemented in software using software components or hardware and software components.

First calculating unit 115 calculates first actuator position error 140 for the first pylon from a difference between first position 110 and commanded first position 150. Actuator position error 140 can also be called an actuator command, as shown in FIG. 1. Second calculating unit 125 calculates second actuator position error 160 for the second pylon from a difference between second position 120 and commanded second position 170. First actuator position error 140 is used, for example, to move the first pylon relative to the wing, and second actuator position error 160 is, for example, used to move the second pylon relative to the wing. Actuator position error 160 can also be called an actuator command, as shown in FIG. 1. First position 110 is a first pylon angle relative to the wing, and second position 120 is a second pylon angle relative to the wing, for example. First position 110 is obtained from one or more sensors monitoring the first pylon, and second position 120 is obtained from one or more sensors monitoring the second pylon. Commanded first position 150 and commanded second position 170 are obtained from an operator of the tiltrotor aircraft. The tiltrotor aircraft can be a manned vehicle or an unmanned vehicle. An unmanned vehicle is, for example, a remotely piloted vehicle.

First comparator 115 is used to compare the absolute value of first actuator position error 140 to preset limit 130. Second comparator 125 is used to compare the absolute value of second actuator position error 160 to preset limit 130. The absolute value of first actuator position error 140 is obtained using absolute value unit 165, and the absolute value of second actuator position error 160 is obtained using absolute value unit 175. Preset limit 130 is a pylon angle and is two degrees, for example.

First calculating unit 115 is connect to switching unit 155 through first comparator 135, and second calculating unit 125 is connected to switching unit 155 through second comparator 145. If the absolute value of first actuator position error 140 is greater than or equal to preset limit 130, switching unit 155 switches an input of second calculating unit 125 so that second actuator position error 160 is calculated from the difference between first position 110 and second position 120. Similarly, if the absolute value of second actuator position error 160 is greater than or equal to preset limit 130, switching unit 155 switches an input of first calculating unit 115 so that first actuator position error 140 is calculated from the difference between first position 110 and second position 120.

In another embodiment of the present invention, system 100 includes third comparator 185 and fourth comparator 195. Third comparator 185 and fourth comparator 195 are used to reset system 100 once a fault is no longer detected. Third comparator 185 is connected between first calculating unit 115 and switching unit 155. Third comparator 185 compares the absolute value of first actuator position error 140 to second preset limit 180. If the absolute value of first actuator position error 140 is less than or equal to second preset limit 180, switching unit 155 switches an input to second calculating unit 125 so that second calculating unit 125 is reset to calculate second actuator position error 160 from the difference between second position 120 and commanded second position 170.

Fourth comparator 195 is connected between second calculating unit 125 and switching unit 155. Fourth comparator 195 compares the absolute value of second actuator position error 160 to second preset limit 180. If the absolute value of second actuator position error is less than or equal to second preset limit 180, switching unit 155 switches an input to first calculating unit 115 so that first calculating unit 115 is reset to calculate first actuator position error 140 from the difference between first position 110 and commanded first position 150. Second preset limit 180 is a pylon angle and is one degree, for example.

In another embodiment of the present invention, switching unit 155 is used to prevent a fault from being detected in a pylon if a fault has already been detected in the other pylon. If second actuator position error 160 is calculated from the difference between first position 110 and second position 120 and the absolute value of second actuator position error 160 is greater than or equal to preset limit 130, switching unit 155 switches an input of first calculating unit 115 so that first calculating unit 115 calculates first actuator position error 140 from first position 110 and first position command 150. If first actuator position error 140 is calculated from the difference between first position 110 and second position 120 and the absolute value of first actuator position error 140 is greater than or equal to preset limit 130, switching unit 155 switches an input of second calculating unit 125 so that second calculating unit 125 calculates second actuator position error 160 from the difference between second position 120 and commanded second position 170.

In another embodiment of the present invention, switching unit 155 includes set/reset latch 131, set/reset latch 141, switch 137, switch 139, switch 147, and switch 149. Set/reset latch 131 and switch 149 are used to change the inputs to second calculating unit 125. For example, if the absolute value of first actuator position error 140 is greater than or equal to preset limit 130, which means a fault is detected at the first pylon, an output of set/rest latch 131 causes switch 149 to change the input of second calculating unit 125 from commanded second position 170 to first position 110, which means the second pylon is made to follow the first pylon. If the absolute value of first actuator position error 140 is less than or equal to second preset limit 180, which means a fault is no longer detected at the first pylon, an output of set/rest latch 131 causes switch 149 to change the input to second calculating unit 125 from first position 110 to commanded second position 170, which means the second pylon is made to receive second pylon commands again.

Similarly set/reset latch 141 and switch 139 are used to change the inputs to first calculating unit 115. For example, if the absolute value of second actuator position error 160 is greater than or equal to preset limit 130, which means a fault is detected at the second pylon, an output of set/rest latch 141 causes switch 139 to change the input of first calculating unit 115 from commanded first position 150 to second position 120, which means the first pylon is made to follow the second pylon. If the absolute value of second actuator position error 160 is less than or equal to second preset limit 180, which means a fault is no longer detected at the second pylon, an output of set/rest latch 141 causes switch 139 to change the input of first calculating unit 115 from second position 120 to commanded first position 150, which means the first pylon is made to receive first pylon commands again.

Set/reset latch 131 and switch 147 are also used to prevent a fault detected at the second pylon from having any effect if a fault was already detected at the first pylon. For example, if the absolute value of first actuator position error 140 is greater than or equal to preset limit 130, which means a fault is detected at the first pylon, switch 147 is opened. Therefore, if subsequently the absolute value of second actuator position error 160 is greater than or equal to preset limit 130, which means a fault is detected at the second pylon, switch 139 will be unaffected and will continue to provide first calculating unit 115 with commanded first position 150 as input. If the absolute value of first actuator position error 140 is less than or equal to second preset limit 180, which means a fault is no longer detected at the first pylon, switch 147 is closed to allow a fault to be detected at the second pylon.

Similarly, set/reset latch 141 and switch 137 are also used to prevent a fault detected at the first pylon from having any effect if a fault was already detected at the second pylon. For example, if the absolute value of second actuator position error 160 is greater than or equal to preset limit 130, which means a fault is detected at the second pylon, switch 137 is opened. Therefore, if subsequently the absolute value of first actuator position error 140 is greater than or equal to preset limit 130, which means a fault is detected at the first pylon, switch 149 will be unaffected and will continue to provide second calculating unit 125 with commanded second position 170 as input. If the absolute value of second actuator position error 160 is less than or equal to second preset limit 180, which means a fault is no longer detected at the second pylon, switch 137 is closed to allow a fault to be detected at the first pylon.

Figure 2:
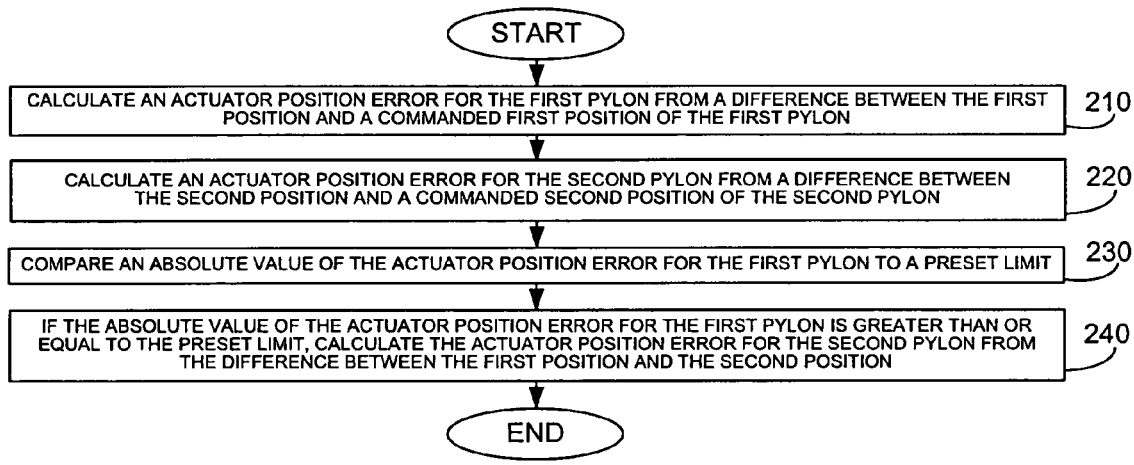
FIG. 2 is a flowchart showing a method for preventing a difference in the positions of a first pylon and a second pylon of a tiltrotor aircraft by monitoring a difference between a first position of the first pylon and a first commanded position of the first pylon and a difference between a second position of the second pylon and a second commanded position of the first pylon, where the first pylon and the second pylon are located at either end of a wing of a tiltrotor aircraft, in accordance with an embodiment of the present invention.

FIG. 2 is a flowchart showing a method 200 for preventing a difference in the positions of a first pylon and a second pylon of a tiltrotor aircraft by monitoring a difference between a first position of the first pylon and a first commanded position of the first pylon and a difference between a second position of the second pylon and a second commanded position of the first pylon, where the first pylon and the second pylon are located at either end of a wing of a tiltrotor aircraft, in accordance with an embodiment of the present invention. The first position is a pylon angle relative to the wing, and the second position is a pylon angle relative to the wing, for example. The first position is obtained from one or more sensors monitoring the first pylon, and the second position is obtained from one or more sensors monitoring the second pylon. The tiltrotor aircraft can be a manned or an unmanned vehicle.

In step 210 of method 200, an actuator position error for the first pylon is calculated from a difference between the first position and a commanded first position of the first pylon. The actuator position error for the first pylon is used to move the first pylon relative to the wing, for example.

In step 220, an actuator position error for the second pylon is calculated from a difference between the second position and a commanded second position of the second pylon. The actuator position error for the second pylon is used to move the second pylon relative to the wing, for example. The commanded second position of the second pylon is obtained from an operator of the tiltrotor aircraft, for example.

In step 230, an absolute value of the actuator position error for the first pylon is compared to the preset limit. The preset limit is a pylon angle and has a value of two degrees, for example.

In step 240, if the absolute value of the actuator position error for the first pylon is greater than or equal to the preset limit, the actuator position error for the second pylon is calculated from the difference between the first position and the second position.

In another embodiment of the present invention, the absolute value of the actuator position error for the first pylon is compared to a second preset limit. If the absolute value of the actuator position error for the first pylon is less than or equal to the second preset limit, actuator position error for the second pylon is calculated from the difference between the second position and the commanded second position. The second preset limit is a pylon angle and has a value of one degree, for example.

In another embodiment of the present invention, if the absolute value of the actuator position error for the second pylon is greater than or equal to the preset limit, the actuator position error for the first pylon is calculated from the difference between the first position and the second position.

In another embodiment of the present invention, the absolute value of the actuator position error for the second pylon is compared to a second preset limit. If the absolute value of the actuator position error for the second pylon is less than or equal to the second preset limit, actuator position error for the first pylon is calculated from the difference between the first position and the commanded first position.

In another embodiment of the present invention, if the actuator position error for the second pylon is calculated from the difference between the first position and the second position and an absolute value of the actuator position error for the second pylon is greater than or equal to the first preset limit, the actuator position error for the first pylon is calculated from the first position and the commanded first position.

In another embodiment of the present invention, if the actuator position error for the first pylon is calculated from the difference between the first position and the second position and an absolute value of the actuator position error for the first pylon is greater than or equal to the first preset limit, the actuator position error for the second pylon is calculated from the second position and the commanded second position.

Figure 3:
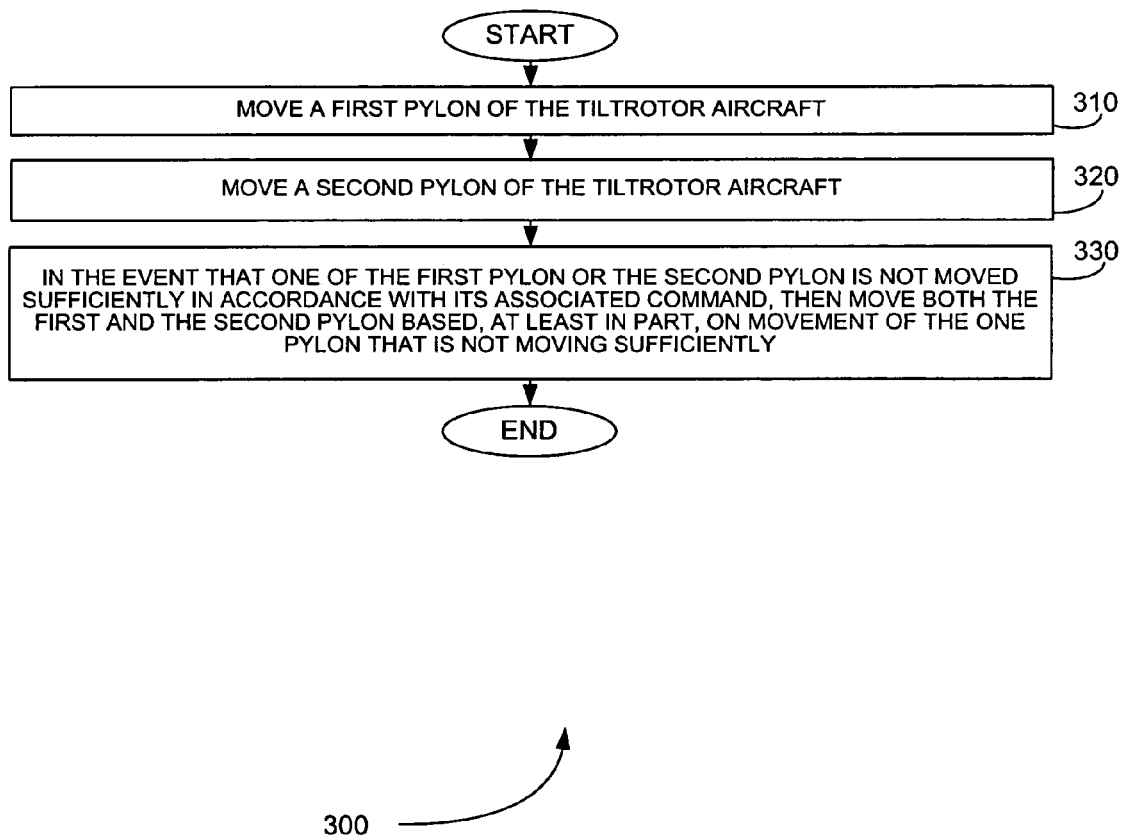
FIG. 3 is a flowchart showing a method for moving first and second pylons for a tiltrotor aircraft, in accordance with an embodiment of the present invention.
Figure 4:
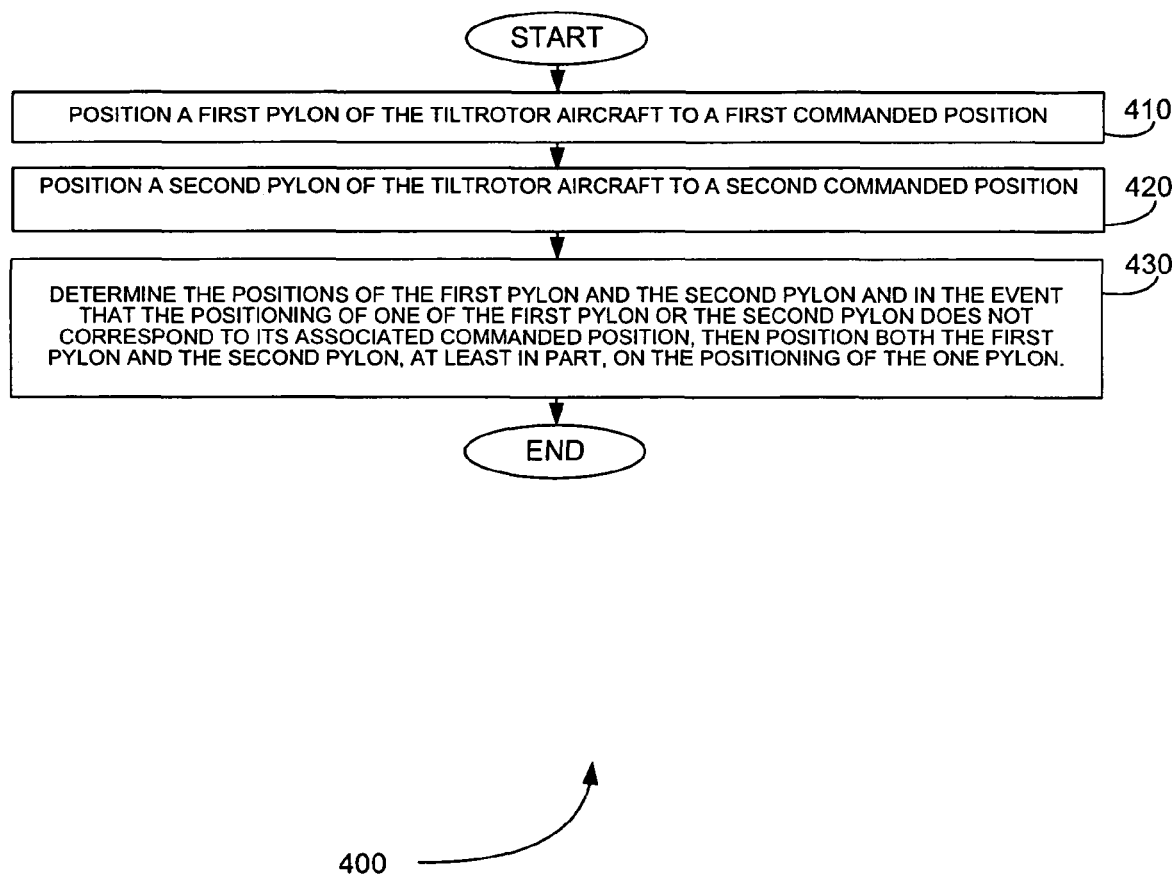
FIG. 4 is a flowchart showing a method for positioning first and second pylons for a tiltrotor aircraft, in accordance with an embodiment of the present invention.

FIG. 3 is a flowchart showing a method 300 for moving first and second pylons for a tiltrotor aircraft, in accordance with an embodiment of the present invention.

In step 310 of method 300, a first pylon of the tiltrotor aircraft is moved. The location of the first pylon is a first position and the first position is a first pylon angle relative to the wing, for example. The first position is obtained from one or more sensors monitoring the first pylon, for example.

In step 320, a second pylon of the tiltrotor aircraft is moved. The location of the second pylon is a second position and the second position is a second pylon angle relative to the wing, for example. The second position is obtained from one or more sensors monitoring the second pylon, for example.

In step 330, in the event of determining that one of the first pylon or the second pylon is not moved sufficiently in accordance with its associated command, then both the first and the second pylon are moved based, at least in part, on movement of the one pylon that is not moving sufficiently. The first pylon is commanded to a command first position, and the second pylon is commanded to a commanded second position. The commanded first position and the commanded second position are obtained from an operator of the tiltrotor aircraft, for example. The tiltrotor aircraft is a manned vehicle or an unmanned vehicle.

FIG. 5 is a flowchart showing a method 500 for positioning first and second pylons for a tiltrotor aircraft, in accordance with an embodiment of the present invention.

In step 410 of method 400, a first pylon of the tiltrotor aircraft is positioned to a first commanded position. The first commanded position is obtained from an operator of the tiltrotor aircraft, for example. The first commanded position is obtained from an operator of the tiltrotor aircraft.

In step 420, a second pylon of the tiltrotor aircraft is positioned to a second commanded position. The first commanded position is obtained from an operator of the tiltrotor aircraft, for example. The second commanded position is obtained from an operator of the tiltrotor aircraft.

In step 430, the positions of the first pylon and the second pylon are determined. In the event that the positioning of one of the first pylon or the second pylon does not correspond to its associated commanded position, then both the first pylon and the second pylon are positioned, at least in part, on the positioning of the one pylon. The location of the first pylon is a first position and the location of the second pylon is a second position. The first position is a first pylon angle relative to the wing, and the second position is a second pylon angle relative to the wing, for example. The first position is obtained from one or more sensors monitoring the first pylon, and the second position is obtained from one more sensors monitoring the second pylon, for example. The tiltrotor aircraft is a manned vehicle or an unmanned vehicle.

In accordance with an embodiment of the present invention, instructions (i.e., a software program) configured to be executed by a processor to perform a method are stored on a computer-readable medium. The computer-readable medium can be a device that stores digital information. For example, a computer-readable medium includes a compact disc read-only memory (CD-ROM) as is known in the art for storing software, or any other form of data storage. The computer-readable medium is accessed by a processor suitable for executing instructions configured to be executed. The terms "instructions configured to be executed" and "instructions to be executed" are meant to encompass any instructions that are ready to be executed in their present form (e.g., machine code) by a processor, or require further manipulation (e.g., compilation, decryption, or provided with an access code, etc.) to be ready to be executed by a processor.

Systems and methods in accordance with an embodiment of the present invention disclosed herein can advantageously prevent crashes of tiltrotor aircraft for these types of pylon drive system faults. If pylons are stopped when an error or a disagreement between pylon positions and pylon commanded positions happens, there is no way to know when or if the pylons are again capable of following commands. Systems and methods in accordance with an embodiment of the present invention let the pylons move together at a slower rate if either one cannot be driven at its normal rate.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method for preventing a pylon difference between a first position of a first pylon and a second position of a second pylon by monitoring a first command difference between the first position and a commanded first position of the first pylon and a second command difference between the second position and a commanded second position of the second pylon, wherein the first pylon and the second pylon are located at either end of a wing of a tiltrotor aircraft, comprising:
    calculating, using a first calculating unit, a first actuator position error for the first pylon from the first command difference;
    calculating, using a second calculating unit, a second actuator position error for the second pylon from the second command difference;
    comparing, using a first comparator, a first absolute value of the first actuator position error to a first preset limit; and
    if the first absolute value is greater than or equal to the first preset limit, switching, using a switching unit, an input of the second calculating unit so as to calculate the second actuator position error from the pylon difference.

2. The method of claim 1, wherein the first position comprises a first pylon angle relative to the wing, and the second position comprises a second pylon angle relative to the wing.

3. The method of claim 1, wherein the first actuator position error is used to move the first pylon relative to the wing, and the second actuator position error is used to move the second pylon relative to the wing.

4. The method of claim 1, wherein the first preset limit comprises a pylon angle.

5. The method of claim 4, wherein the first preset limit comprises two degrees.

6. The method of claim 1, wherein the first position is obtained from one or more sensors monitoring the first pylon, and the second position is obtained from one more sensors monitoring the second pylon.

7. The method of claim 1, wherein the commanded first position and the commanded second position are obtained from an operator of the tiltrotor aircraft.

8. The method of claim 1, wherein the tiltrotor aircraft is one of a manned vehicle and an unmanned vehicle.

9. The method of claim 1, further comprising comparing the first absolute value to a second preset limit and if the first absolute value is less than or equal to a second preset limit, calculating the second actuator position error from the second command difference.

10. The method of claim 9, wherein the second preset limit is a pylon angle.

11. The method of claim 9, wherein the second preset limit is one degree.

12. The method of claim 1, further comprising
    comparing a second absolute value of the second actuator position error to the first preset limit; and
    if the second absolute value is greater than or equal to the first preset limit, calculating the first actuator position error for the first pylon from the pylon difference.

13. The method of claim 12, further comprising if the second actuator position error is calculated from the pylon difference and the second absolute value is greater than or equal to the first preset limit, calculating the first actuator position error from the first command difference.

14. The method of claim 1, further comprising if the first actuator position error is calculated from the pylon difference and the first absolute value is greater than or equal to the first preset limit, calculating the second actuator position error from the second command difference.

15. The method of claim 12, further comprising comparing the second absolute value to a second preset limit and if the second absolute value is less than or equal to a second preset limit, calculating the first actuator position error from the first command difference.

16. A system for preventing a pylon difference between a first position of a first pylon and a second position of a second pylon by monitoring a first command difference between the first position and a commanded first position of the first pylon and a second command difference between the second position and a commanded second position of the second pylon, wherein the first pylon and the second pylon are located at either end of a wing of a tiltrotor aircraft, comprising:
    a first calculating unit, wherein the first calculating unit calculates a first actuator position error for the first pylon from the first command difference;
    a second calculating unit, wherein the second calculating unit calculates a second actuator position error for the second pylon from the second command difference;
    a first comparator for comparing a first absolute value of the first actuator position error to a first preset limit;
    a second comparator for comparing a second absolute value of the second actuator position error to the first preset limit; and
    a switching unit, wherein the first calculating unit is connected to the switching unit through the first comparator and the second calculating unit is connected to the switching unit through the second comparator and wherein if the first absolute value is greater than or equal to the first preset limit, the switching unit switches an input of the second calculating unit so that the second actuator position error is calculated from the pylon difference.

17. The system of claim 16, further comprising
    a third comparator, wherein the third comparator is connected between the first calculating unit and the switching unit and the third comparator compares the first absolute value to a second preset limit and if the first absolute value is less than or equal to the second preset limit, the switching unit switches an input to the second calculating unit so that the second calculating unit calculates the second actuator position error from the second command difference; and a fourth comparator, wherein the fourth comparator is connected between the second calculating unit and the switching unit and the fourth comparator compares the second absolute value to the second preset limit and if the second absolute value is less than or equal to the second preset limit, the switching unit switches an input to the first calculating unit so that the first calculating unit calculates the first actuator position error from the first command difference.

18. The system of claim 16, wherein if the second actuator position error is calculated from the pylon difference and the second absolute value is greater than or equal to the first preset limit, the first calculating unit calculates the first actuator position error from the first command difference.

19. A method for controlling first and second pylons for a tiltrotor aircraft, comprising:
moving, using a first actuator, a first pylon of the tiltrotor aircraft;
moving, using a second actuator, a second pylon of the tiltrotor aircraft;
determining whether the first pylon and the second pylon are moving in accordance with their associated command; and
in the event it is determined that said one of the first pylon or the second pylon is not moving in accordance with its associated command, then moving, using the first and the second actuator, both the first and the second pylon based, at least in part, on movement of the one pylon that is not moving in accordance with its associated command.

20. The method of claim 19, wherein a location of the first pylon is a first position and a location of the second pylon is a second position.

21. The method of claim 19, wherein the first pylon is commanded to a commanded first position and the second pylon is commanded to a commanded second position.

22. The method of claim 20, wherein the first position comprises a first pylon angle relative to the wing, and the second position comprises a second pylon angle relative to the wing.

23. The method of claim 20, wherein the first position is obtained from one or more sensors monitoring the first pylon, and the second position is obtained from one more sensors monitoring the second pylon.

24. The method of claim 21, wherein the commanded first position and the commanded second position are obtained from an operator of the tiltrotor aircraft.

25. A method for controlling first and second pylons for a tiltrotor aircraft, comprising:
positioning, using a first actuator, a first pylon of the tiltrotor aircraft to a first commanded position;
positioning, using a second actuator, a second pylon of the tiltrotor aircraft to a second commanded position; and
determining the positions of the first pylon and the second pylon, and in the event of determining that the positioning of one of the first pylon or the second pylon does not correspond to its associated commanded position, then positioning, using the first and the second actuator, both the first pylon and the second pylon based, at least in part, on the positioning of the one pylon.

26. The method of claim 25, wherein the first commanded position and the second commanded position are obtained from an operator of the tiltrotor aircraft.

27. The method of claim 25, wherein a location of the first pylon is a first position and a location of the second pylon is a second position.

28. The method of claim 27, wherein the first position comprises a first pylon angle relative to the wing, and the second position comprises a second pylon angle relative to the wing.

29. The method of claim 27, wherein the first position is obtained from one or more sensors monitoring the first pylon, and the second position is obtained from one more sensors monitoring the second pylon.

* * * * *